United States Patent
Nagao

(10) Patent No.: US 11,604,615 B2
(45) Date of Patent: Mar. 14, 2023

(54) PRINTING SYSTEM FOR SUPPRESSING WASTEFUL TRANSMISSION OF NOTIFICATION INFORMATION

(71) Applicant: Canon Kabushiki Kaisha, Tokyo (JP)

(72) Inventor: Keisuke Nagao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 17/082,240

(22) Filed: Oct. 28, 2020

(65) Prior Publication Data

US 2021/0132872 A1    May 6, 2021

(30) Foreign Application Priority Data

Oct. 30, 2019    (JP) .............................. JP2019-197518

(51) Int. Cl.
*G06F 3/12* (2006.01)
*H04L 51/224* (2022.01)
*H04L 51/234* (2022.01)

(52) U.S. Cl.
CPC ............ *G06F 3/123* (2013.01); *G06F 3/1208* (2013.01); *H04L 51/224* (2022.05); *H04L 51/234* (2022.05)

(58) Field of Classification Search
None
See application file for complete search history.

(56) References Cited

U.S. PATENT DOCUMENTS 11,399,004 B2 *    7/2022    Murata ................. A63F 13/795

FOREIGN PATENT DOCUMENTS

JP    2015090564 A    5/2015

* cited by examiner

*Primary Examiner* — Eric A. Rust
(74) *Attorney, Agent, or Firm* — Venable LLP

(57) ABSTRACT

A communication system and a control method are provided, which are capable of suppressing wasteful transmission of notification information. To this end, in a case where predetermined information is not received despite that notification information has been transmitted, this problem is solved by providing an information processing apparatus having a control unit configured to perform control so that the notification information is not transmitted anew.

19 Claims, 13 Drawing Sheets

NOTIFICATION INFORMATION

| APPLICATION ID | DEVICE TOKEN (TERMINAL INFORMATION) |
|---|---|
| "abcd" | "AAA" |

NOTIFICATION INFORMATION 701

| APPLICATION ID | DEVICE TOKEN (TERMINAL INFORMATION) | RECEPTION RATIO |
|---|---|---|
| "abcd" | "AAA" | 0/0 × 100% |

| APPLICATION ID | DEVICE TOKEN (TERMINAL INFORMATION) | RECEPTION RATIO |
|---|---|---|
| "abcd" | "AAA" | 0/1 × 100% |

| APPLICATION ID | DEVICE TOKEN (TERMINAL INFORMATION) | RECEPTION RATIO |
|---|---|---|
| "abcd" | "AAA" | 1/1 × 100% |

| APPLICATION ID | DEVICE TOKEN (TERMINAL INFORMATION) | RECEPTION RATIO |
|---|---|---|
| "abcd" | "AAA" | 3/10 × 100% |

FIG.11

NOTIFICATION INFORMATION 1101

| APPLICATION ID | DEVICE TOKEN (TERMINAL INFORMATION) | MESSAGE | DATE OF TRANSMISSION |
|---|---|---|---|
| "abcd" | "AAA" | "Printing has been completed" | MARCH 10 |
| "abcd" | "AAA" | "Ink has run out." | MARCH 15 |

NOTIFICATION INFORMATION  1201

| APPLICATION ID | DEVICE TOKEN (TERMINAL INFORMATION) | LAST TRANSMISSION DATE |
|---|---|---|
| "abcd" | "AAA" | 2018/11/11 |

NOTIFICATION INFORMATION 1301

| APPLICATION ID | DEVICE TOKEN (TERMINAL INFORMATION) | NOTIFICATION MESSAGE | IMPORTANCE LEVEL (1 HIGH TO 5 LOW) | RECEPTION RATIO |
|---|---|---|---|---|
| "abcd" | "AAA" | "Campaign information" | 1 | 3/10 |

PRINTING SYSTEM FOR SUPPRESSING WASTEFUL TRANSMISSION OF NOTIFICATION INFORMATION

BACKGROUND OF THE INVENTION

Field of the Invention

The present invention relates to an information processing apparatus and a control method.

Description of the Related Art

Japanese Patent Laid-Open No. 2015-090564 describes that a communication terminal of user A transmits a message to a communication terminal of user B and that in a case where the message is opened at the communication terminal of user B, the communication terminal of user A is notified of that.

However, Japanese Patent Laid-Open No. 2015-090564 does not describe whether or not to perform, in a case where a message is not opened at the communication terminal of user B, transmission of the message to the communication terminal of user B after that. As a result, Japanese Patent Laid-Open No. 2015-090564 has such a problem that despite the situation in which a message is not opened or displayed at the communication terminal of user B, there is a possibility that the message is transmitted wastefully after that from the communication terminal of user A.

SUMMARY OF THE INVENTION

Consequently, the present invention provides an information processing apparatus and a control method, capable of suppressing wasteful transmission of notification information.

Because of the above, the control method of the present invention is a control method of a system including an information processing apparatus and a terminal apparatus, the control method comprising: transmitting, by the information processing apparatus, notification information to be received by the terminal apparatus, which corresponds to a predetermined application program that is installed in the terminal apparatus; notifying, based on the notification information received by the terminal apparatus in a case where the predetermined application program is installed in the terminal apparatus; receiving, by the information processing apparatus, predetermined information based on that notification based on the notification information has been performed by the terminal apparatus; and controlling, so that the information processing apparatus does not transmit the notification information anew in a case where the predetermined information is not received by the information processing apparatus despite that the notification information has been transmitted from the information processing apparatus.

According to the present invention, it is possible to provide an information processing apparatus and a control method, capable of suppressing wasteful transmission of notification information.

Further features of the present invention will become apparent from the following description of exemplary embodiments with reference to the attached drawings.

BRIEF DESCRIPTION OF THE DRAWINGS

FIG. 5 is a diagram showing an example of a database saved by the push notification server;

FIG. 7A is a diagram showing an example of a database saved by a save unit of the push notification server;

FIG. 7B is a diagram showing an example of a database saved by the save unit of the push notification server;

FIG. 7C is a diagram showing an example of a database saved by the save unit of the push notification server;

FIG. 7D is a diagram showing an example of a database saved by the save unit of the push notification server;

FIG. 11 is a diagram showing a database that saves notification information not transmitted;

FIG. 12 is a diagram showing an example of a database automatically registered in a server; and FIG. 13 is a diagram showing an example of a database automatically registered in the server.

DESCRIPTION OF THE EMBODIMENTS

First Embodiment

In the following, a first embodiment of the present invention is explained with reference to the drawings. The following embodiment is not intended to limit the present invention relating to the claims and all combinations of features explained in the present embodiment is not necessarily indispensable to the solution of the present invention.

Figure 1:
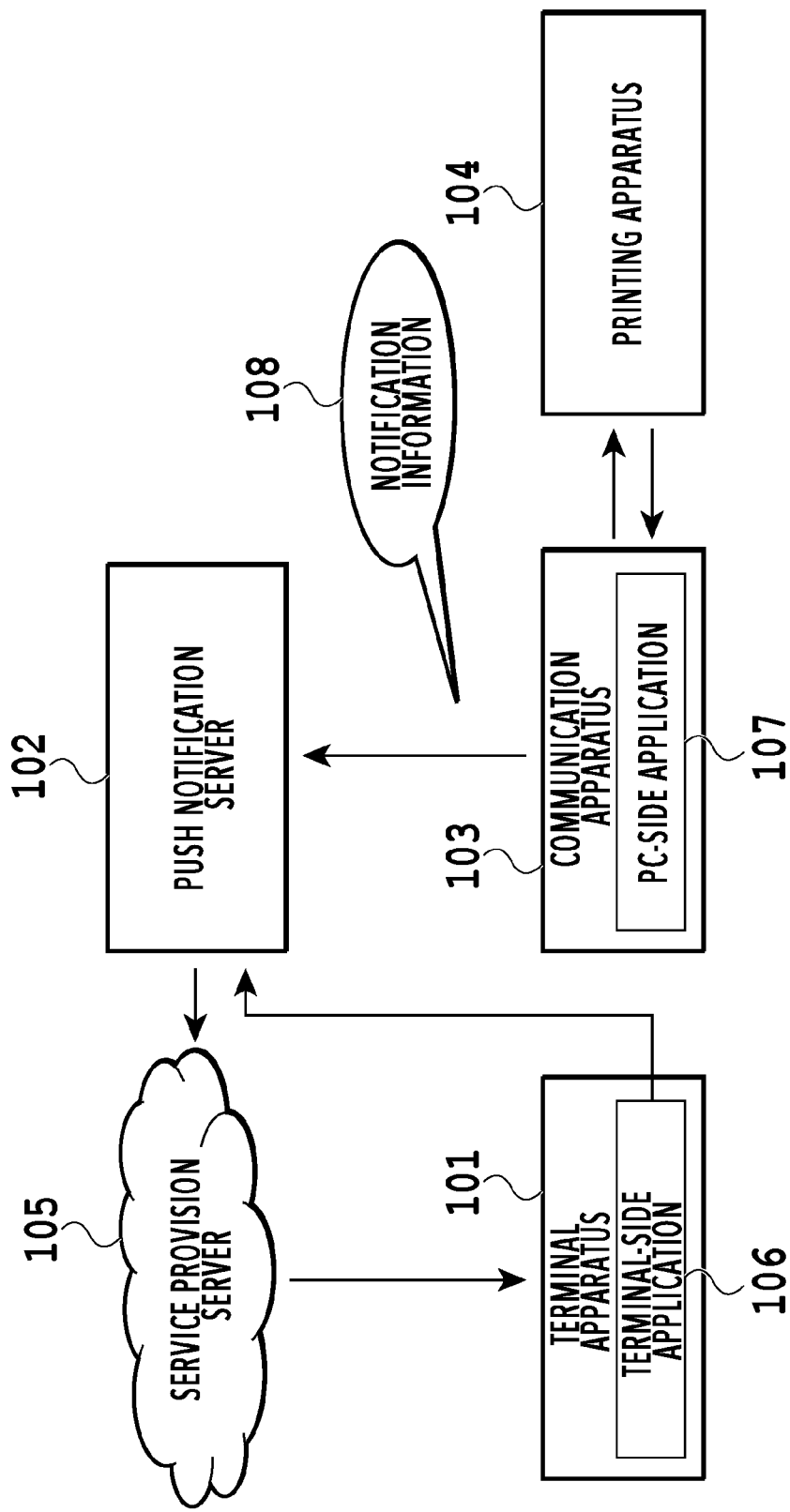
FIG. 1 is a diagram showing an example of a configuration of a communication system.

FIG. 1 is a diagram showing an example of a configuration of a communication system in the present embodiment. The communication system of the present embodiment includes a service provision server 105, a push notification server 102, a terminal apparatus 101, a communication apparatus 103, and a printing apparatus 104. In the present embodiment, as the terminal apparatus 101 a smartphone is described as an example. Here, the smartphone refers to a multi-function mobile telephone mounting functions as a camera and a web browser, an electronic mail function and the like, in addition to the function of a mobile telephone. The terminal apparatus to which the present invention can be applied is not limited to a smartphone and may be any apparatus capable of communicating with a communication apparatus, to be described later. For example, it is possible to apply the present invention to a digital camera, a mobile telephone, a personal computer (PC), a tablet terminal, a PDA (Personal Digital Assistant) and the like as the terminal apparatus.

Further, as the communication apparatus, the information processing apparatus (PC) is described as an example in the present embodiment, but the communication apparatus is not limited to this. It is possible to apply various apparatuses as the communication apparatus as long as they are capable of communicating with a terminal apparatus. For example, it is also possible to apply the present embodiment to a printing apparatus and apparatuses capable of providing services other than printing, such as copy machine, facsimile, smartphone, mobile telephone, tablet terminal, PDA, digital camera, music reproduction device, storage, projector, and smart speaker. Further, in the present embodiment, as the printing apparatus that is controlled by the communication apparatus, an ink jet apparatus that prints a large size sheet is described as an example, but the printing apparatus is not limited to this. For example, the printing apparatus may be an apparatus that performs printing by a printing method other than the ink jet method (electrophotographic method, thermal sublimation method and the like).

The terminal apparatus 101 stores a terminal-side application 106 and displays information on a display unit based on notification information including a notification item, which is transmitted from the service provision server 105. The terminal-side application 106 analyzes the notification information transmitted from the service provision server 105 and notifies the operating system (hereinafter, referred to as OS) of the analysis results. Consequently, the terminal-side application 106 has the function to cause the OS to display a message based on notification information and the function to transmit the fact that the notification information has been received to the push notification server 102. The terminal-side application 106 also has the function to transmit a print job to the printing apparatus 104 and cause the printing apparatus 104 to perform printing by wirelessly connecting with the printing apparatus 104.

Further, the terminal apparatus 101 is capable of communicating with the service provision server 105 via the internet and receives notification information via the internet. It may also be possible for the terminal apparatus 101 to communicate with the internet via the mobile communication network, such as 4G and LTE, or communicate with the internet via Wi-Fi connection with a wireless LAN router, not shown schematically.

The communication apparatus 103 comprises a PC-side application 107 and controls the printing apparatus 104 by the PC-side application 107. Specifically, the communication apparatus 103 transmits a print job for causing printing to be performed to the printing apparatus 104, receives a notification relating to the printing apparatus 104 from the printing apparatus 104, and so on. The notification relating to the printing apparatus 104 is, for example, a notification to the effect that the printing performed by the printing apparatus 104 based on a print job has been completed, or a notification to the effect that an error has occurred in the printing apparatus 104. In a case of receiving a notification relating to the printing apparatus 104 from the printing apparatus 104, the communication apparatus 103 transmits notification information 108 that causes the terminal apparatus 101 to display information based on the notification to the push notification server 102. It may also be possible for the communication apparatus 103 to display information based on the notification on a display unit.

In a case of receiving the notification information 108 from the communication apparatus 103, it is possible for the push notification server 102 to transmit the received notification information 108 to the terminal apparatus 101 via the service provision server 105. At this time, it may also be possible for the push notification server 102 to transmit notification information to a plurality of the terminal apparatuses 101 in order to cause a plurality of apparatuses to display the information.

The service provision server 105 is a server that provides a push notification service. In the present embodiment, the OS has a push notification function to display a notification area on the display unit by a push notification. Because of this, in order to use the push notification function, it is necessary to make use of a push notification service corresponding to each OS. That is, it is necessary for the push notification server 102 to transmit notification information via the service provision server 105 in place of directly transmitting notification information to the terminal apparatus 101. The push notification service that is made use of is different for each OS of the terminal apparatus 101 that receives a notification by the push notification. That is, the push notification server 102 transmits notification information to the terminal apparatus 101 via the service provision server 105 different for each OS of the terminal apparatus 101, which is the target of the push notification.

The communication between the service provision server 105 and the terminal apparatus 101 can be accessed only by the service provision server. In a case of receiving notification information from the service provision server 105, the terminal-side application 106 transmits a reception notification, which is reception information indicating that the terminal apparatus 101 has received the notification information, to the push notification server 102. In the present embodiment, the push notification server 102 or the service provision server 105 is configured by one server, but the present embodiment is not limited to this aspect. The server system corresponding to the push notification server 102 or the service provision server 105 may be configured by a plurality of serves operating in conjunction with one another. Further, each server is configured as an information processing apparatus.

Figure 2:
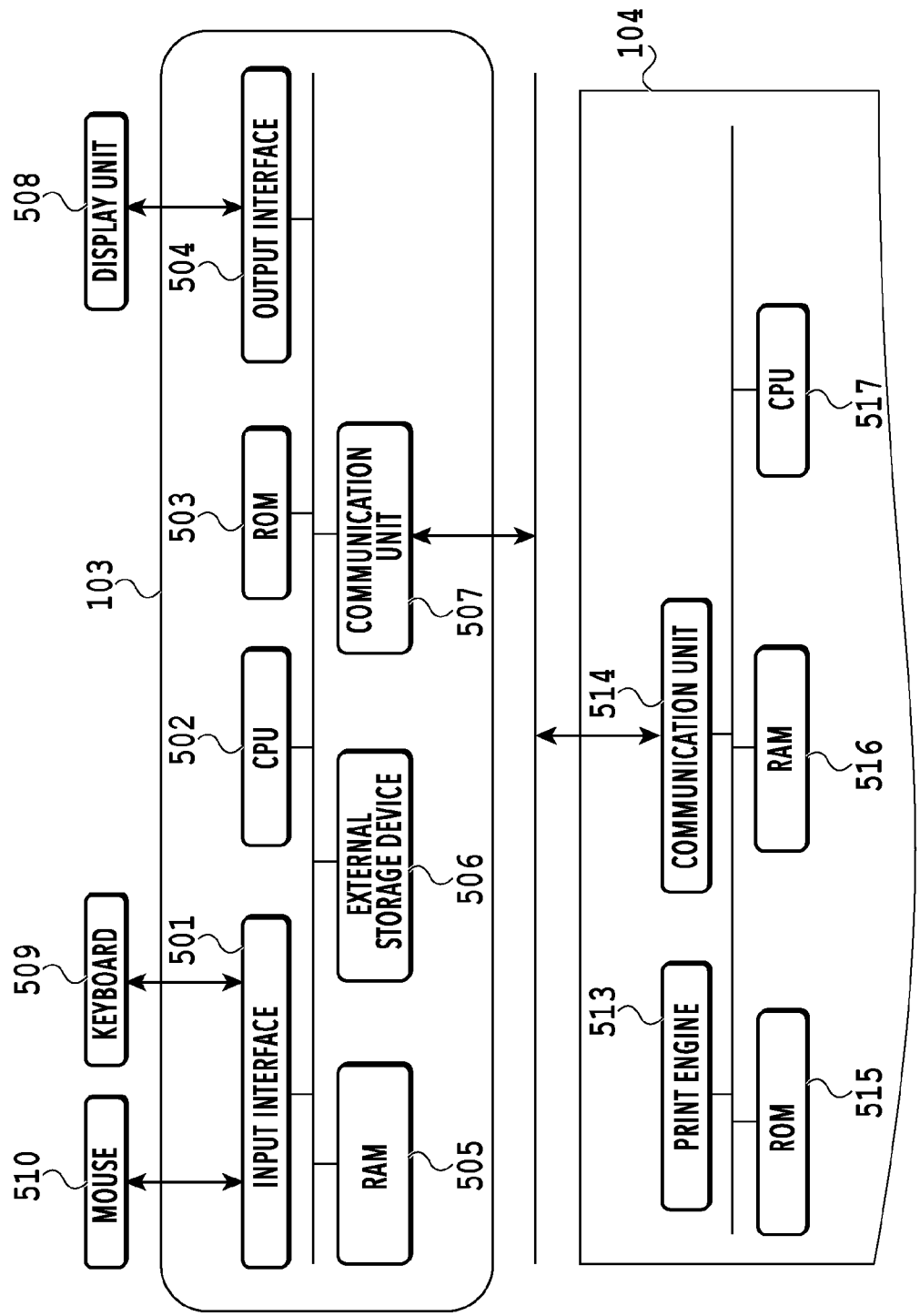
FIG. 2 is a diagram showing an example of a configuration of a communication apparatus and a printing apparatus.

FIG. 2 is a diagram showing an example of a configuration of the communication apparatus 103 and the printing apparatus 104. The communication apparatus 103 comprises an input interface 501, a CPU 502, a ROM 503, an output interface 504, a RAM 505, an external storage device 506, a communication unit 507 and the like. In the communication apparatus 103, a computer is formed by the CPU 502, the ROM 503 and the like. The input interface 501 is an interface that receives a data input or operation instructions from a user by a mouse 510 or a keyboard 509 being operated. The CPU 502 is a system control unit and controls the entire communication apparatus 103.

The ROM 503 stores fixed data, such as control programs, an incorporated OS, and programs, which is executed by the CPU 502.

The RAM 505 includes an SRAM (Static Random Access Memory) or the like, which needs a backup electric power source. In the RAM 505, data is stored by a primary battery for data backup, not shown schematically. Because of this, it is possible for the RAM 505 to store important data, such as program control variables, without volatilization thereof. Further, a memory area that stores setting information on the communication apparatus 103, management data on the communication apparatus 103, and the like is also provided in the RAM 505. Furthermore, the RAM 505 is also used as a main memory and a work memory of the CPU 502.

The external storage device 506 stores programs, such as the PC-side application 107 that controls the printing apparatus 104 connected via the communication unit 507 and generates a print job that can be interpreted by the printing apparatus 104, various kinds of information used by the programs, and the OS.

The output interface 504 is an interface by which a display unit 508 performs control to display various kinds of data and a screen based on a notification received from the printing apparatus 104.

The display unit 508 includes an LED (light-emitting diode), an LCD (liquid crystal display) and the like and displays various kinds of data and a screen based on a notification received from the printing apparatus 104. It may also be possible to receive an input from a user via the display unit 508 by installing an operation unit of a numerical number input key, a mode setting key, a determination key, a cancel key, an electric power source key and the like on the display unit 508.

The communication unit 507 has a configuration for performing data communication by connecting with another apparatus. For example, it is possible for the communication unit 507 to connect to an access point (not shown schematically) within the printing apparatus 104. By the communication unit 507 and the access point within the printing apparatus 104 connecting with each other, it is made possible for the communication apparatus 103 and the printing apparatus 104 to communicate with each other. It may also be possible for the communication unit 507 to communicate directly with the printing apparatus 104 by wireless communication or perform communication via an external apparatus existing outside the communication apparatus 103 and the printing apparatus 104. The external apparatus includes an apparatus capable of relaying communication by an external access point existing outside the communication apparatus 103 and outside the printing apparatus 104, or by other than the access point.

Further, as the external access point, mention is made of, for example, a device, such as a wireless LAN router. The communication method that the communication unit 507 makes use of is not limited to the wireless communication method and may be a wired communication method, such as USB (Universal Serial Bus) and a wired LAN.

Further, it is possible for the communication unit 507 to communicate with the push notification server 102 via the internet by making use of the internet via an external device, such as a wireless LAN router.

The communication apparatus 103 may have a plurality of communication units for communicating with other apparatuses by communication methods different from one another. Then, the communication unit for the communication apparatus 103 and the printing apparatus 104 to perform communication and the communication unit for the communication apparatus 103 and the push notification server 102 to perform communication may be different from each other.

The printing apparatus 104 comprises a print engine 513, a communication unit 514, a ROM 515, a RAM 516, a CPU 517 and the like. The communication unit 514 has a configuration for performing data communication by connecting with another apparatus. For example, the communication unit 514 has an access point for connecting with an apparatus, such as the communication apparatus 103, as the access point inside the printing apparatus 104. It is possible for the access point to connect to the communication unit 507 of the communication apparatus 103. It may also be possible for the communication unit 514 to communicate directly with the communication apparatus 103 by wireless communication or to perform communication via an external apparatus. Further, it may also be possible for the communication unit 514 to comprise hardware that functions as an access point or to operate as an access point by software for causing the communication unit 514 to function as an access point. The communication method that the communication unit 514 makes use of is not limited to the wireless communication method and may be a wired communication method, such as USB and a wired LAN.

The RAM 516 includes an SRAM or the like, which needs a backup electric power source. In the RAM 516, data is stored by a primary battery for data backup, not shown schematically, and therefore, it is possible for the RAM 516 to store important data, such as program control variables, without volatilization thereof. Further, a memory area that stores setting information on the printing apparatus 104, management data on the printing apparatus 104, and the like is also provided in the RAM 516. Furthermore, the RAM 516 is also used as a main memory and a work memory of the CPU 517 and saves a reception buffer for temporarily saving print information received from the communication apparatus 103 and the like and various kinds of information.

The ROM 515 stores fixed data, such as control programs, data tables, and OS programs, which is executed by the CPU 517. In the present embodiment, each control program stored in the ROM 515 performs software execution control, such as scheduling, task switching, and interrupt processing, under management of the incorporated OS stored in the ROM 515.

The CPU 517 is a system control unit and controls the entire printing apparatus 104.

The print engine 513 forms an image by attaching a printing material (ink or the like) onto a printing medium, such as paper, based on information saved in the RAM 516 and a print job received from the communication apparatus 103 and the like and outputs the printing results. To the printing apparatus 104, a memory, such as an external HDD and an SD card, may be attached as an optional device, and the information saved in the printing apparatus 104 may be saved in the memory.

Figure 3:
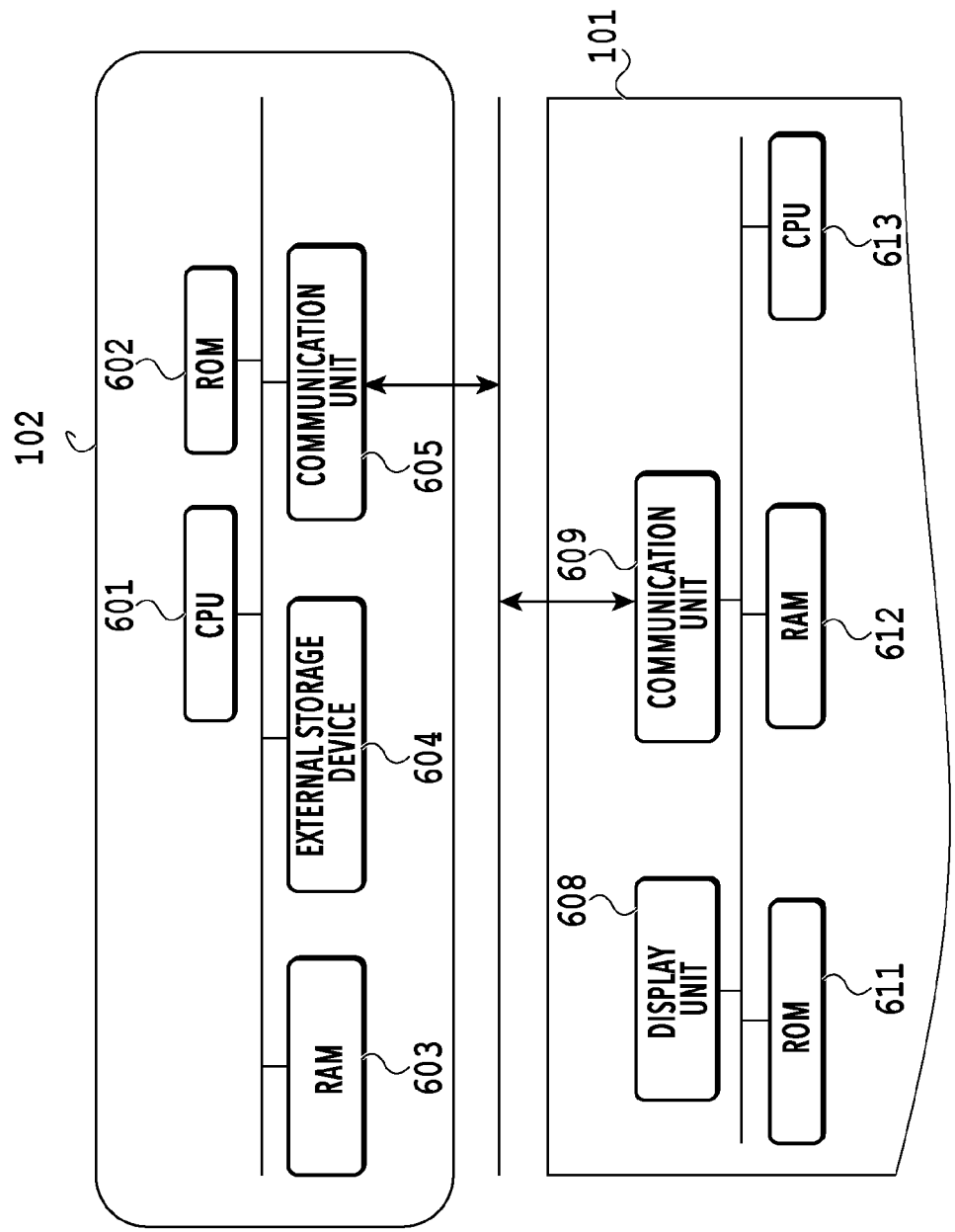
FIG. 3 is a diagram showing an example of a configuration of a push notification server and a terminal apparatus.

FIG. 3 is a diagram showing an example of a configuration of the push notification server 102 and the terminal apparatus 101. The push notification server 102 has a CPU 601, a ROM 602, a RAM 603, an external storage device 604, a communication unit 605 and the like. In the push notification server 102, a computer is formed by the CPU 601, the ROM 602 and the like. The CPU 601 is a system control unit and controls the entire push notification server 102. The ROM 602 stores fixed data, such as control programs, data tables, OS, and programs, which is executed by the CPU 601. In the present embodiment, each control program stored in the ROM 602 performs software execution control, such as scheduling, task switching, and interrupt processing, under management of the incorporated OS stored in the ROM 602.

The RAM 603 includes an SRAM or the like, which needs a backup electric power source. In the RAM 603, data is stored by a primary battery for data backup, not shown schematically, and therefore, it is possible for the RAM 603 to store important data, such as program control variables, without volatilization thereof. Further, a memory area that stores setting information on the push notification server 102, management data on the push notification server 102, and the like is also provided in the RAM 603. Furthermore, the RAM 603 is also used as a main memory and a work memory of the CPU 601. The external storage device 604 saves programs and the like for performing push notification for the terminal apparatus 101 by making use of the service provision server 105.

Figure 4:
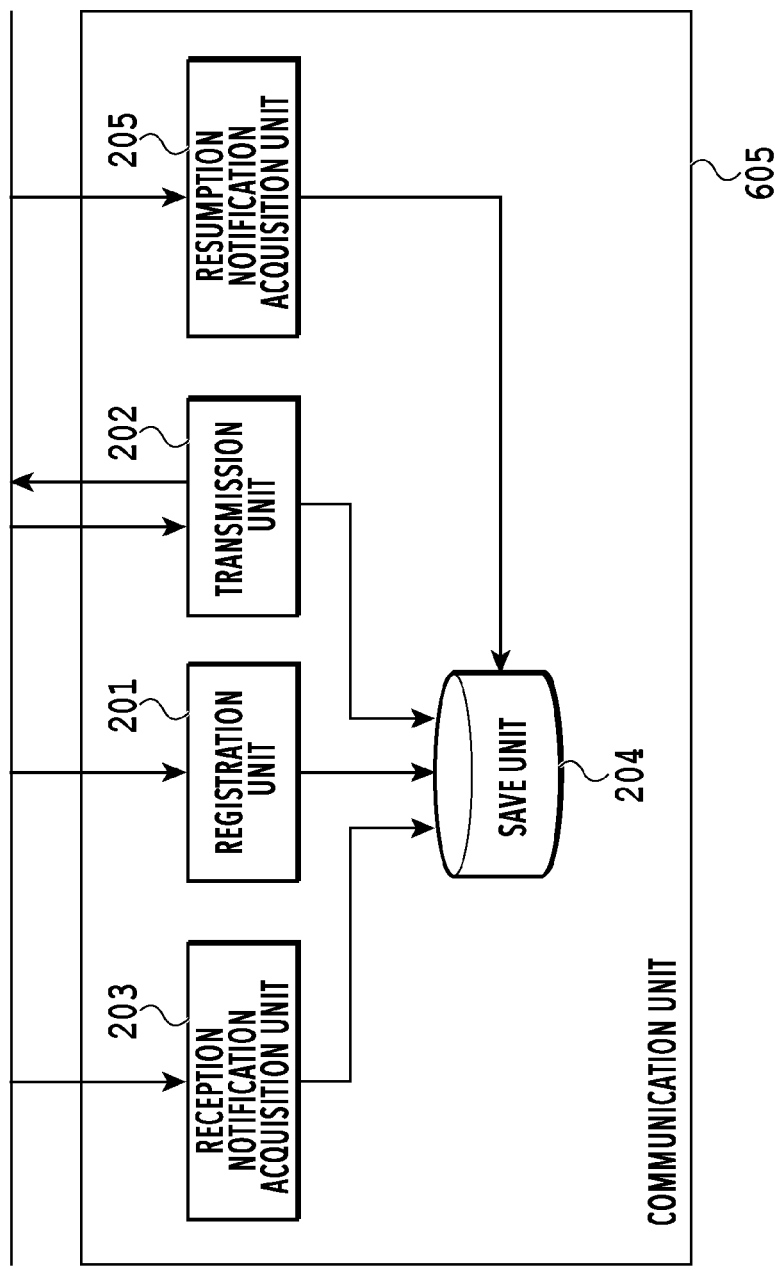
FIG. 4 is a diagram showing an example of a configuration of a communication unit of the push notification server.

FIG. 4 is a diagram showing an example of a configuration of the communication unit 605 of the push notification server 102. The communication unit 605 comprises a registration unit 201 configured to receive registration processing from the terminal apparatus 101 and a transmission unit 202 configured to communicate with the communication apparatus 103, an external server that provides the service provision server 105, and the like. Further, the communication unit 605 comprises a reception notification acquisition unit 203 configured to receive a reception notification of notification information from the terminal apparatus 101 and a resumption notification acquisition unit 205 configured to receive a resumption notification. Furthermore, the communication unit 605 saves notification information at the time of communication of the registration processing, the reception notification, and the resumption notification respectively in a database of a save unit 204.

It may also be possible for the push notification server 102 to have a plurality of communication units for communicating with other apparatuses by communication methods different from one another. Then, the communication unit for the push notification server 102 and the communication apparatus 103 to perform communication and the communication unit for the push notification server 102 and the external server that provides the service provision server 105 to perform communication may be different from each other. Further, the configuration of the service provision server 105 is the same as the configuration of the push notification server 102.

Returning to FIG. 3, the terminal apparatus 101 has a display unit 608, a communication unit 609, a ROM 611, a RAM 612, a CPU 613 and the like. The CPU 613 is a system control unit and controls the entire terminal apparatus 101. The ROM 611 stores fixed data, such as control programs, data tables, and OS programs, which is executed by the CPU 613. In the present embodiment, each control program stored in the ROM 611 performs software execution control, such as scheduling, task switching, and interrupt processing, under management of the incorporated OS stored in the ROM 611. Further, the ROM 611 saves various programs, such as the terminal-side application 106, for displaying a screen based on notification information by analyzing the notification information that is received, and various kinds of information used by these programs.

The RAM 612 includes an SRAM or the like, which needs a backup electric power source. In the RAM 612, data is stored by a primary battery for data backup, not shown schematically, and therefore, it is possible for the RAM 612 to store important data, such as program control variables, without volatilization thereof. Further, a memory area that stores setting information on the terminal apparatus 101, management data on the terminal apparatus 104, and the like is also provided in the RAM 612. Furthermore, the RAM 612 is also used as a main memory and a work memory of the CPU 613.

The display unit 608 includes an LED (light-emitting diode), an LCD (liquid crystal display) and the like and displays various kinds of data and a screen based on notification information. It may also be possible to receive an input from a user via the display unit 608 by installing an operation unit of a numerical value input key, a mode setting key, a determination key, a cancel key, an electric power source key and the like on the display unit 608.

The communication unit 609 has a configuration for performing data communication with another apparatus. For example, the communication unit 609 receives information from the push notification server 102 and the communication apparatus 103 via the internet by connecting with an external device, such as a wireless LAN router, and making use of the internet. The communication method that the communication unit 607 makes use of is not limited to the wireless communication method and may be the wired communication method, such as USB (Universal Serial Bus) and a wired LAN.

In order to perform push notification for the terminal apparatus 101, it is necessary to perform in advance registration processing for the push notification. The processing on the side of the communication apparatus 103 in the registration processing, to be explained in the following, is implemented by the CPU 502 executing the PC-side application 107. Further, the processing on the side of the terminal apparatus 101 in the registration processing, to be explained in the following, is implemented by the CPU 613 executing the terminal-side application 106.

In the registration processing, first, the communication apparatus 103 displays a QR code (registered trademark) on the display unit 508 by receiving a predetermined operation from a user for generating the QR code. Next, the terminal apparatus 101 reads the QR code displayed on the display unit 508 with a camera, not shown schematically, comprised by the terminal apparatus 101. Then, by analyzing the read QR code, the terminal apparatus 101 acquires identification information on the PC-side application 107 having generated the QR code and an application ID (GUID), which is a unique value allocated to each PC at the time of installation of the application 107.

Next, the terminal apparatus 101 transmits identification information on the terminal apparatus 101 and information obtained by analyzing the QR code to the push notification server 102 as registration information via the internet. The address used as the address of the transmission destination of the registration information and the server name of the push notification server 102 are stored in advance in the terminal-side application 106. The identification information on the terminal apparatus 101 includes, for example, a device token necessary for push notification reception and OS information (kind of OS, version of OS and the like) relating to the OS stored in the terminal apparatus 101. Here, the device token is terminal information provided from the OS stored by the terminal apparatus 101 and includes identification information on the terminal-side application 106, and the like. Consequently, by acquiring the device token, it is possible to identify the terminal apparatus 101.

In the push notification server 102, the registration unit 201 acquires registration information and the save unit 204 saves application ID information on the PC-side application 107 and the device token from the identification information on the terminal apparatus 101 in a database 301.

Further, the information that is transmitted to the push notification server 102 may not be acquired from the QR code. For example, it may also be possible for the terminal apparatus 101 first to read information displayed in the text format by the communication apparatus 103 with a camera, not shown schematically, comprised by the terminal apparatus 101, and then extract information to be transmitted to the push notification server 102 by analyzing the read information by OCR (Optical Character Recognition/Reader).

Further, for example, it may also be possible for the terminal apparatus 101 to acquire the information to be transmitted to the push notification server 102 via the connection by connecting with the communication apparatus 103 by the wireless communication method or the wired communication method. Due to this, the push notification server 102 recognizes that the information should be transmitted to the relevant device token (terminal apparatus 101) from the database 301 based on from which PC-side application 107 the application ID of the notification information is received. In this manner, the registration processing is completed.

FIG. 5 is a diagram showing an example of the database 301 that the push notification server saves. In FIG. 5, the application ID is abcd and the device token is AAA, but it is assumed that the values of these application ID and the device token are different depending on the PC in which the database 301 is installed and the terminal that is used.

In the present embodiment, the aspect is explained in which the application ID of the PC-side application 107 and the device token of the terminal apparatus 101 are associated with each other and managed by the push notification server 102, but the present embodiment is not limited to this aspect. For example, it may also be possible to acquire the identification information on the communication apparatus 103 displaying the QR code by the QR code. Then, the identification information on the communication apparatus 103 and the identification information on the terminal apparatus 101 may be associated with each other and managed by the push notification server 102. In this case, the push notification server 102 recognizes to which terminal apparatus 101 the notification information based on the notification message received from which communication apparatus 103 should be transmitted.

Further, for example, it may also be possible for the terminal apparatus 101 to acquire the identification information on the printing apparatus 104 controlled by the PC-side application 107 by reading the QR code. Then, the identification information on the printing apparatus 104 and the identification information on the terminal apparatus 101 may be associated with each other and managed by the push notification server 102. In this case, the push notification server 102 recognizes to which terminal apparatus 101 the notification information based on the notification message relating to which printing apparatus 104 should be transmitted.

Further, the registration processing may be performed, for example, by the method described below. First, the terminal apparatus 101 connects with the communication apparatus 103 by the wireless communication method or the wired communication method and transmits the identification information on the terminal apparatus 101 to the communication apparatus 103 via the connection. The communication apparatus 103 transmits the identification information on the PC-side application 107 and the identification information on the terminal apparatus 101 to the push notification server 102 as the registration information via the internet. As described above, also by the identification information on the PC-side application 107 and the identification information on the terminal apparatus 101 being associated with each other and managed by the push notification server 102, the registration processing is completed.

In this registration processing also, the identification information on the communication apparatus 103 and the identification information on the terminal apparatus 101 may be associated with each other and managed by the push notification server 102. Further, the identification information on the printing apparatus 104 and the identification information on the terminal apparatus 101 may be associated with each other and managed by the push notification server 102.

The transmission method of the registration information in the registration processing is not limited in particular. For example, the transmission method may be the HTTP method in which the registration information is converted into the HTML format and then transmitted, or the FTP method in which the registration information is created as a file format and then the file is transmitted.

Further, the registration information may be data encrypted by a security key shared by the push notification server 102 and the terminal-side application 106. Furthermore, the registration information may be binary data, or text data, such as UTF-8, or data encoded by a method, such as Base64.

Here, the push notification is explained. The push notification is a notification method in which an application automatically gives a notification to the terminal apparatus 101 by a display or sound by using the push notification service in a case where there is some change or there is a need for notification in an application of a smartphone, software of a personal computer or the like. In the present embodiment, the communication apparatus 103 transmits information relating to the printing apparatus 104 to the push notification server 102 as the notification information 108. Then, the push notification server 102 transmits the notification information 108 to the terminal apparatus 101 via the service provision server 105 by making use of the push notification service. Due to this, the push notification server 102 notifies the terminal apparatus 101 of the information relating to the printing apparatus 104. In a case of receiving notification information, the terminal apparatus 101 displays a notification area for notification of the notification information 108 on a screen displayed by the display unit 608.

Figure 6:
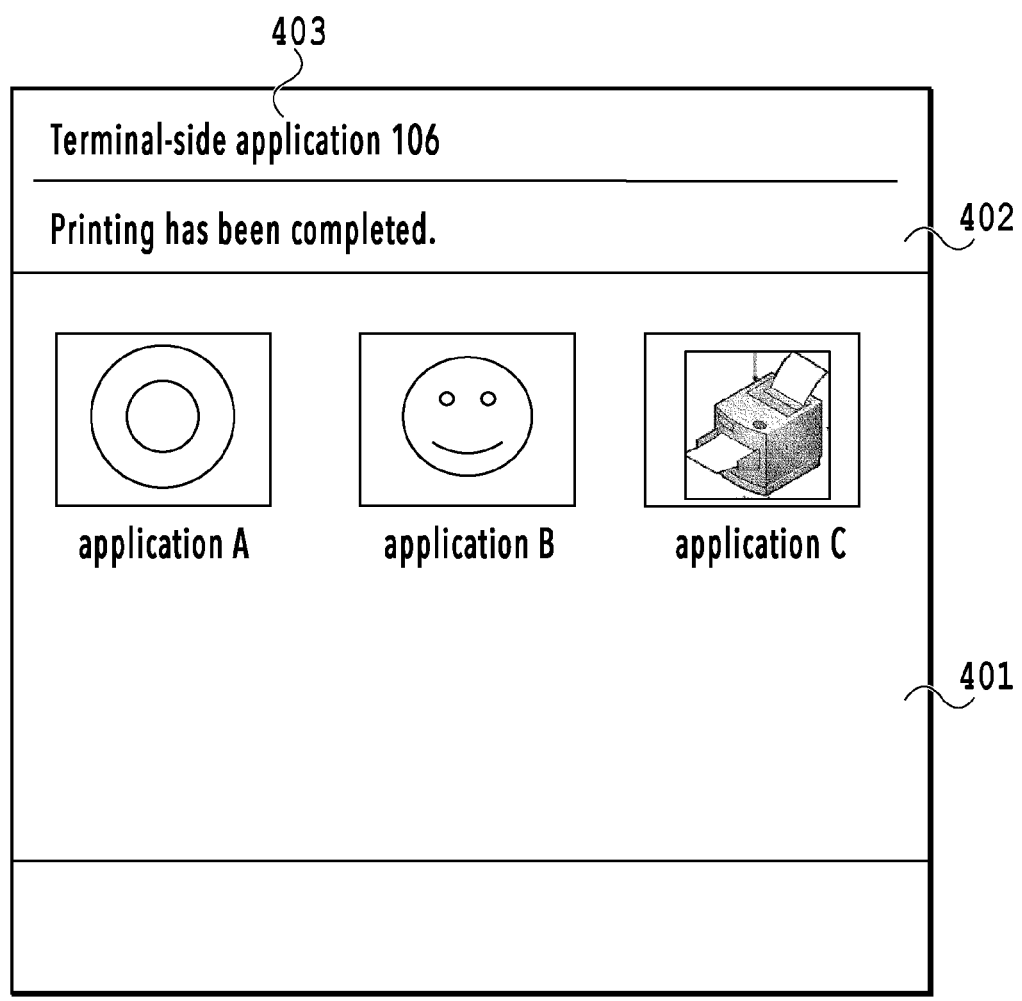
FIG. 6 is a diagram showing a screen of the terminal apparatus on which a notification area is displayed.

FIG. 6 is a diagram showing a screen of the terminal apparatus 101 on which a notification area is displayed by the push notification function. An area 401 shows the maximum area that the display unit 608 can display and an area 402 shows a notification area for notification of the notification information 108. Further, an area 403 is an area showing an icon indicating to which application the notification area that is displayed corresponds, or information relating to the name of the application to which the notification area that is displayed corresponds.

In the present embodiment, as the application corresponding to the notification area that is displayed, the terminal-side application 106 is displayed. Then, in a case where the notification area is operated by a user, the terminal apparatus 101 causes the terminal-side application 106 to move to the foreground and displays the screen that is displayed by the terminal-side application 106 on the entire surface of the display unit 608. The screen that is displayed at this time is a screen that is displayed based on the notification information and for example, a screen for giving a notification of the contents notified by the notification area in more detail than in the notification area.

The terminal apparatus 101 having received notification information displays a notification area corresponding to the notification information in a case where the application (in the present embodiment, the terminal-side application 106) corresponding to the notification information is installed in the terminal apparatus 101. In other words, in a case where the terminal-side application 106 is not installed in the terminal apparatus 101, the terminal apparatus 101 does not display a notification area corresponding to notification information even though the terminal apparatus 101 receives the notification information. Further, for example, in a case where the terminal-side application 106 is installed but not in operation (not activated) on the background or the foreground in the terminal apparatus 101, the terminal apparatus 101 does not display a notification area corresponding to notification information even though the terminal apparatus 101 receives the notification information.

Further, for example, in a case where notification by the terminal-side application 106 is not permitted by the setting in the terminal apparatus 101, the terminal apparatus 101 does not display a notification area corresponding to notification information even though the terminal apparatus 101 receives the notification information. Furthermore, for example, in a case where the power saving setting is validated in the terminal apparatus 101, the terminal apparatus 101 does not display a notification area corresponding to notification information even though the terminal apparatus 101 receives the notification information. As describe above, the states of the terminal apparatus 101 include a state where a notification area corresponding to notification information is not displayed, and therefore, in the conventional aspect, there is a case where notification information is transmitted from the service provision server 105 despite that the notification area corresponding to the notification information is not displayed. The case where the application corresponding to the notification information is not installed in the terminal apparatus 101 is, for example, a case where the terminal-side application 106 is uninstalled from the terminal apparatus 101. Further, the setting of whether or not to permit notification by the terminal-side application 106 and validation and invalidation of the power saving setting are performed by the setting application for performing the setting of the terminal apparatus 101.

In general, in a case where the notification area corresponding to notification information is not displayed, it is not necessary for the service provision server 105 to transmit notification information. In a case where notification information is transmitted wastefully, there is such a problem that an unnecessary load is imposed on the service provision server 105 or a communication resource is consumed unnecessarily. Consequently, in the present embodiment, control for suppressing notification information from being transmitted wastefully is performed.

Figure 8:
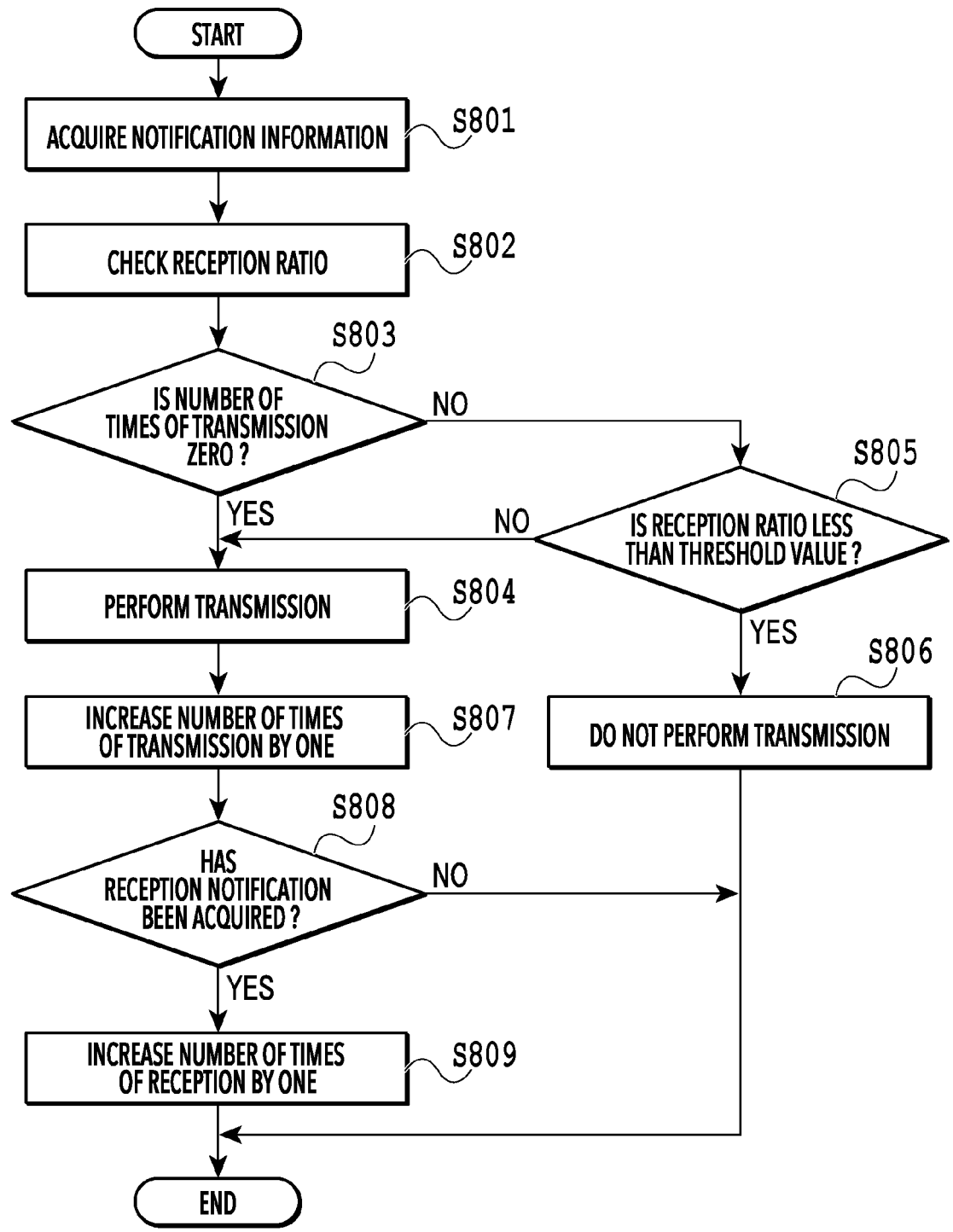
FIG. 8 is a flowchart of transmission processing in which the push notification server transmits notification information.

FIG. 8 is a flowchart of transmission processing in which the push notification server 102 transmits notification information. In FIG. 8, there is no description on activation of a program, but it is assumed that the program of the push notification server 102 stays resident and activated. In the following, by using the flowchart in FIG. 8, the transmission processing by the push notification server 102 of the present embodiment is explained. The main unit of the series of processing shown in the sequence in FIG. 8 is the CPU 601 of the push notification server 102 and the series of processing is performed by the CPU 601 loading a program code stored in a disk device or the like onto the RAM and executing the program code. Alternatively, it may also be possible to implement part or all of the functions at the steps in FIG. 8 by hardware, such as an ASIC and an electronic circuit. The following explanation is given on the assumption that the main unit is the push notification server 102.

In a case where transmission processing is started, at S801, the push notification server 102 receives the notification information 108 from the communication apparatus 103 and checks the application ID of the notification information 108. Here, it is assumed that the application ID is abcd. After that, at S802, the push notification server 102 specifies the device corresponding to the received application ID based on the application ID received from the transmission unit 202 of the communication unit 605 and the database relating to the already registered apparatus as shown in FIG. 5. Specifically, the push notification server 102 acquires the device token indicating the device corresponding to the received application ID. Then, at S802, the push notification server 102 specifies the reception ratio of the reception notification from the device specified at S802 and the number of times (number of times of transmission) the notification information is transmitted to the device specified at S802. The reception ratio referred to here is calculated by dividing the number of times (number of times of reception) the reception notification is received from the device specified at S802 by the number of times of transmission. That is, the push notification server 102 specifies the ratio of the number of times of reception to the number of times of transmission. The reception ratio corresponding to each apparatus managed by the push notification server 102 is managed by the database as shown in FIG. 7A to FIG. 7D.

After that, at S803, the push notification server 102 determines whether or not the transmission of notification information to be performed from now is the first transmission of notification information to the device specified at S802. Specifically, the push notification server 102 determines whether or not the number of times of transmission (number of times of transmission specified at S802) relating to the device specified at S802 is zero. In a case of the first transmission to the device specified at S802, the database relating to the device specified at S802 is as indicated by a database 701. In a case of the first transmission of notification information to the device specified at S802, the push notification server 102 causes the processing to move to S804. At S804, the push notification server 102 transmits the notification information 108 to the device specified at S802 (here, the terminal apparatus 101) via the service provision server 105. After that, the push notification server 102 updates the database at S807. Specifically, the push notification server 102 saves again the database relating to the device specified at S802 like a database 702 by increasing the number of times of transmission by one. Then, at S808, the push notification server 102 determines whether or not the reception notification from the device specified at S802 has been received. The reception notification is transmitted to the push notification server 102 in a case where the terminal-side application 106 is installed in the device specified at S802 and the notification area corresponding to notification information is displayed in the device specified at S802. In a case where the reception notification has been received, the push notification server 102 causes the processing to move to S809 and updates the database. Specifically, the push notification server 102 increases the number of times of reception by one and saves the database again relating to the device specified at S802 like a database 703. By the above, the transmission processing is terminated.

At S803, in a case where it is determined that the transmission is not the first transmission for the device specified at S802, the push notification server 102 causes the processing to move to S805. At 805, the push notification server 102 determines whether or not the reception ratio specified at S802 is less than a threshold value (threshold value is 40% in the present embodiment). In a case where the reception ratio is less than the threshold value, the processing moves to S804. In a case where the reception ratio is not less than the threshold value, the processing moves to S806. At S806, the push notification server 102 specifies that the transmission of notification information is not performed for the device specified at S802. After that, the push notification server 102 terminates the transmission processing. In a case where the terminal-side application 106 is uninstalled from the device specified at S802 and the notification based on notification information is not performed, no reception notification is transmitted, and therefore, the reception ratio of reception notification is reduced. Because of this, by this determination, in a state where the terminal-side application 106 is uninstalled from the device specified at S802, it is possible to suppress the transmission of notification information.

It may also be possible for the push notification server 102 to transmit information for giving a notification to the effect that notification information is not transmitted to the device specified at S802 to the communication apparatus 103. Further, it may also be possible for the push notification server 102 to transmit information for giving a notification to the effect that it is no longer possible for the device specified at S802 to perform notification based on notification information or information for prompting a user to install the terminal-side application 106 in the terminal apparatus 101 to the communication apparatus 103.

Figure 9:
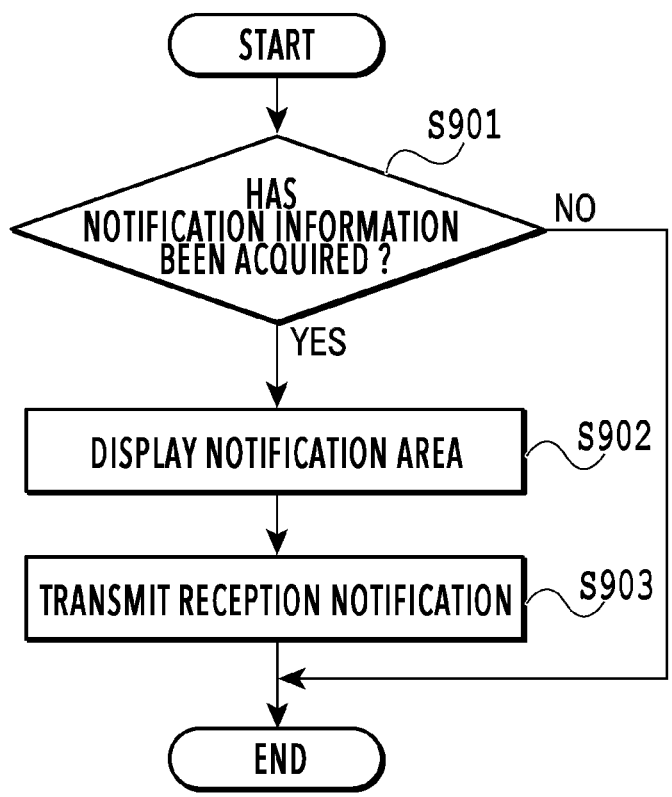
FIG. 9 is a flowchart showing reception notification transmission processing to transmit a reception notification.

FIG. 9 is a flowchart showing reception notification transmission processing in which the terminal apparatus 101 having received notification information transmits a reception notification. It is assumed that the flowchart in FIG. 9 is performed in a state where the terminal-side application 106 is installed in the terminal apparatus 101. Further, the flowchart in FIG. 9 is started in a case where the terminal apparatus 101 receives notification information from the push notification server 102. In the following, by using the flowchart in FIG. 9, the reception notification transmission processing by the terminal apparatus 101 of the present embodiment is explained. The main unit of the series of processing shown by the sequence in FIG. 9 is the CPU 613 of the terminal apparatus 101 and the series of processing is performed by the CPU 613 loading a program code onto the RAM and executing the program code. Alternatively, it may also be possible to implement part or all of the functions at the steps in FIG. 9 by hardware, such as an ASIC and an electronic circuit. The following explanation is given on the assumption that the main unit is the terminal apparatus 101.

In a case where the transmission processing of a reception notification by the terminal apparatus 101 is started, at S901, the terminal apparatus 101 determines whether or not the terminal-side application 106 has acquired the notification information received from the push notification server 102 from the OS of the terminal apparatus 101. In a case where the terminal-side application 106 has acquired the notification information, at S902, the terminal apparatus 101 notifies the OS of the terminal apparatus 101 to display a notification area corresponding to the notification information 108 on the display unit 608 by the terminal-side application 106. Due to this, the notification area corresponding to the notification information 108 is displayed. After that, at S903, the terminal apparatus 101 transmits the reception notification to the reception notification acquisition unit 203 of the push notification server 102. In the notification information having arrived at the terminal-side application 106, information by which it is possible for the side of the push notification server 102 to identify the source of transmission, such as the application ID and the device token, is included and the notification information is transmitted as it is as the reception notification and the transmission processing of the reception notification is terminated. In a case where the terminal-side application 106 has not acquired the notification information at S901, no reception notification is transmitted to the push notification server 102, and therefore, the transmission processing of the reception notification is terminated.

In the state where the terminal-side application 106 is not installed in the terminal apparatus 101, the terminal apparatus 101 does not perform notification based on the notification information even though the notification information is received from the push notification server 102.

Figure 10:
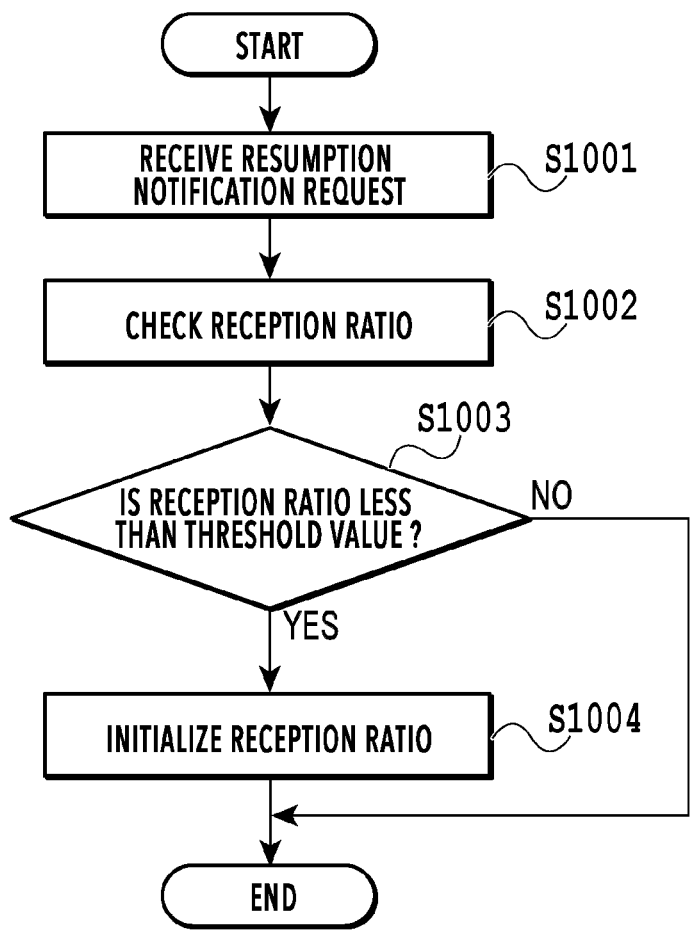
FIG. 10 is a flowchart showing processing at the time of receiving a resumption notification.

FIG. 10 is a flowchart showing processing at the time of the push notification server 102 receiving a resumption notification. In a case where the terminal-side application 106 is installed again in the terminal apparatus 101 or in a case where notification by the terminal-side application 106 is permitted by the setting application, the terminal apparatus 101 transmits a resumption notification to the push notification server 102. Due to this, it is possible for the terminal apparatus 101 to resume reception of notification information.

In a case where the state where it is possible to perform notification based on notification information is returned, the terminal-side application 106 on the terminal apparatus 101 transmits a resumption notification to the push notification server 102. Specifically, the above-described case is, for example, a case where the terminal-side application 106 is installed again in the terminal apparatus 101 or a case where the notification by the terminal-side application 106 is permitted by the setting in the terminal apparatus 101. Further, for example, the above-described case is a case where the terminal-side application 106 starts the operation (is activated) on the background or the foreground or a case where the power saving setting is invalidated in the terminal apparatus 101. In a case where a resumption notification is sent, the application ID and the device token used at the time of registration are sent. In the following, by using the flowchart in FIG. 10, processing at the time of the push notification server 102 of the present embodiment receiving a resumption notification is explained. The main unit of the series of processing shown by the sequence in FIG. 10 is the CPU 601 of the push notification server 102 and the series of processing is performed by the CPU 601 loading a program code onto the RAM and executing the program code. Alternatively, it may also be possible to implement part or all of the functions at the steps in FIG. 10 by hardware, such as an ASIC and an electronic circuit. The following explanation is given on the assumption that the main unit is the push notification server 102.

In a case of receiving a resumption notification at S1001, the push notification server 102 searches the data base from the application ID and the device token obtained form the received resumption notification and checks the reception ratio of the relevant terminal apparatus at S1002. Then, the push notification server 102 determines whether or not the reception ratio is less than a threshold value and in a case where the reception ratio is less than the threshold value, the push notification server 102 causes the processing to move to S1004 and initializes the reception ratio. Specifically, by initializing the information relating to the number of times of transmission and the number of times of reception, which are managed in the database, at the next time of transmission, the transmission becomes the same as the first-time transmission, and therefore, it is possible to resume the transmission processing. In a case where the reception ratio is not less than the threshold value at S1003, the processing at the time of the push notification server 102 receiving the resumption notification is terminated.

FIG. 11 is a diagram showing a database 1101 saving notification information not transmitted on the side of the push notification server 102 of the present embodiment. At the time of reception of a resumption notification, it may also be possible to initialize the reception ratio to 0 without checking whether the reception ratio is less than the threshold value at S1003. Further, it may also be possible for the push notification server 102 to save notification information not transmitted on the database 1101 and transmit the notification information not transmitted en bloc at the time of receiving a resumption notification.

FIG. 12 is a diagram showing an example of a database 1201 automatically registered on the side of the push notification server 102 of the present embodiment.

Further, it may also be possible for the push notification server 102 to keep the last transmission date at the time of transmitting notification information as in FIG. 12 and delete the database 1201 automatically registered on the side of the push notification server 102 in a case where a predetermined period elapses from the last transmission date.

Further, in the present embodiment, the control of whether or not to transmit notification information for performing push notification is explained, but the control is not limited to this and it may also be possible to apply the present embodiment to control of whether or not to transmit information, such as a mail.

As described above, the push notification server calculates the reception ratio at the transmission destination from the number of times of transmission and the number of times of reception at the time of transmitting notification information. Then, in a case where the reception ratio is less than a predetermined value (in the present embodiment, explanation is given by assuming 40%), the push notification server determines that it is not possible for the terminal-side application 106 on the terminal apparatus 101 at the transmission destination to perform notification based on notification information and does not perform transmission. Due to this, it is possible to implement the communication system, the server, and the control method, which are capable of suppressing wasteful transmission of notification information.

Second Embodiment

In the following, a second embodiment of the present invention is explained with reference to the drawings. The basic configuration of the present embodiment is the same as that of the first embodiment, and therefore, in the following, the characteristic configuration is explained.

FIG. 13 is a diagram showing an example of a database 1301 automatically registered on the side of the push notification server 102 of the present embodiment. In the first embodiment, explanation is given that in a case where the reception ratio is less than the predetermined threshold value, transmission is not performed, but the present embodiment is not limited to this aspect. In the present embodiment, at the time of the transmission source transmitting a message, the importance level (in the present embodiment, 1 to 5) of the message is set.

In a case where the reception ratio is less than a predetermined threshold value, the push notification server 102 determines that it is not possible for the terminal to display a notification on a condition that no resumption notification is received and does not perform transmission of notification information. However, as an exception, in a case where a high importance level (in the present embodiment, 1, 2) exceeding a threshold value is attached to the notification information from the communication apparatus 103, the push notification server 102 performs transmission processing even though the reception ratio is less than the threshold value. The notification information whose importance level is high in the present embodiment is, for example, information for prompting a user to update the terminal-side application 106, information for giving a notification to the effect that a serious error has occurred in the printing apparatus 104, and the like.

In the present embodiment, the importance level is divided into five levels of 1 to 5, but the division is not limited to this and it is only required to divide the importance level into a plurality of levels. Further, as regards the high importance level, in the present embodiment, the importance levels 1 and 2 are set as the high importance level, but it is preferable to appropriately perform setting in accordance with the set importance levels.

In the case of the present embodiment, by continuously transmitting a message whose importance level is high, there is a possibility that the reception ratio at the transmission destination whose reception ratio is less than the threshold value increases and exceeds the threshold value. It is made possible to transmit anew even a message whose importance level is low to the transmission destination whose reception ratio has exceeded the threshold value.

As described above, the importance level of a message is set and for notification information for giving a notification of a message whose importance level is high, the transmission processing is performed even in a case where the reception ratio is less than the threshold value. Due to this, it is possible to transmit a message to the transmission destination in accordance with the importance level while suppressing wasteful transmission.

Other Embodiments

In the above description, the terminal apparatus 101 determines whether or not to transmit notification information based on the reception ratio of the reception notification from the terminal apparatus 101, but the embodiment is not limited to this aspect. For example, it is assumed that the terminal apparatus 101 transmits information on whether or not the terminal-side application 106 is installed in the terminal apparatus 101 to the push notification server 102 as appropriate. Specifically, for example, it is assumed that the terminal apparatus 101 transmits the information to the push notification server 102 in a case of receiving notification information. That is, it is assumed that the push notification server 102 is capable of appropriately grasping whether or not the terminal-side application 106 is installed in the terminal apparatus 101. In the aspect such as this, it may also be possible for the terminal apparatus 101 to determine whether or not to transmit notification information by determining whether or not the terminal-side application 106 is installed in the terminal apparatus 101.

Further, in the above description, the notification information that is transmitted to the terminal apparatus 101 is notification information for performing notification relating to the terminal apparatus 101, but the embodiment is not limited to this aspect. The notification information is only required to be notification information for giving a notification of a notification item to be notified by the terminal apparatus 101. Specifically, for example, the notification information may be information for performing notification relating to the updating of the terminal-side application 106 or information for performing notification relating to the function of the terminal-side application 106.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-197518 filed Oct. 30, 2019, which is hereby incorporated by reference wherein in its entirety.

What is claimed is:

1. A control method of an information processing apparatus and a terminal apparatus, the control method comprising:
transmitting notification information to the terminal apparatus;
receiving predetermined information from the terminal apparatus, wherein the predetermined information is transmitted from the terminal apparatus to the information processing apparatus in a case where a notification based on the transmitted notification information is displayed on the terminal apparatus by a predetermined application program installed in the terminal apparatus; and
determining, based on a number of times of reception of the predetermined information, whether the information processing apparatus transmits new notification information.

2. The control method according to claim 1, wherein
in a case where a ratio of the number of times of reception of the predetermined information to a number of times of transmission of the notification information is smaller than a predetermined threshold value, it is determined that the information processing apparatus does not transmit the new notification information.

3. The control method according to claim 1 wherein,
the predetermined information is not transmitted from the terminal apparatus in a case where the predetermined application program is not installed in the terminal apparatus.

4. The control method according to claim 1, wherein
the predetermined information is not transmitted from the terminal apparatus in a case where the notification by the predetermined application program is not permitted by a setting application for performing setting of the terminal apparatus.

5. The control method according to claim 1, wherein
the predetermined information is not transmitted from the terminal apparatus in a case where a power saving setting is validated in the terminal apparatus.

6. The control method according to claim 1, wherein
the predetermined information is not transmitted from the terminal apparatus in a case where the predetermined application program installed in the terminal apparatus is not activated in the terminal apparatus.

7. The control method according to claim 1, further comprising:
performing control so that transmission of the new notification information is resumed in a case where specific information has been received from the terminal apparatus in a state where the new notification information is not transmitted.

8. The control method according to claim 7, wherein
the specific information is transmitted from the terminal apparatus in a case where the predetermined application program has been installed in the terminal apparatus.

9. The control method according to claim 7, wherein
the specific information is transmitted from the terminal apparatus in a case where the notification by the predetermined application program has been permitted by a setting application for performing setting of the terminal apparatus.

10. The control method according to claim 7, wherein
the specific information is transmitted from the terminal apparatus in a case where a power saving setting has been invalidated in the terminal apparatus.

11. The control method according to claim 7, wherein
the specific information is transmitted from the terminal apparatus in a case where the predetermined application program installed in the terminal apparatus has been activated in the terminal apparatus.

12. The control method according to claim 1, further comprising:
transmitting information for performing another kind of notification in the terminal apparatus, which is different from notification based on the notification information, in a case where it is determined that the information processing apparatus does not transmit the new notification information.

13. The control method according to claim 12, wherein
the another kind of notification is notification for prompting a user to install the predetermined application.

14. The control method according to claim 1, wherein
the notification information is information relating to a printing apparatus outside the information processing apparatus and outside the terminal apparatus.

15. The control method according to claim 1, wherein
the predetermined application is an application for causing a printing apparatus to perform printing.

16. The control method according to claim 1, wherein
transmission of the new notification information is performed in a case where an importance level of a transmission-target notification information is higher than a threshold value even though it is determined that the information processing apparatus does not transmit the new notification information.

17. The control method according to claim 1, wherein
the transmission of the notification information is performed with a push notification.

18. The control method according to claim 1, wherein
the notification information is transmitted to the terminal apparatus via a communication apparatus which is different from the information processing apparatus.

19. An information processing apparatus, comprising:
a transmission unit configured to transmit notification information to a terminal apparatus;
a reception unit configured to receive predetermined information from the terminal apparatus, wherein the predetermined information is transmitted from the terminal apparatus to the information processing apparatus in a case where a notification based on the transmitted notification information is displayed on the terminal apparatus by a predetermined application program installed in the terminal apparatus; and
a control unit configured to determine, based on a number of times of reception of the predetermined information, whether the information processing apparatus transmits new notification information.

* * * * *